United States Patent
Kim et al.

(10) Patent No.: US 10,797,509 B2
(45) Date of Patent: *Oct. 6, 2020

(54) METHOD AND SYSTEM FOR MANAGING WIRELESS CHARGING

(71) Applicant: Samsung Electronics Co., Ltd., Suwon-si, Gyeonggi-do (KR)

(72) Inventors: Yu Su Kim, Yongin-si (KR); Ji Young Kim, Suwon-si (KR); Se Ho Park, Yongin-si (KR); Woo Jin Jung, Yongin-si (KR); Young Joon Park, Yongin-si (KR); Jung Su Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,776

(22) Filed: Nov. 1, 2019

(65) Prior Publication Data

US 2020/0067342 A1    Feb. 27, 2020

Related U.S. Application Data

(63) Continuation of application No. 15/689,818, filed on Aug. 29, 2017, now Pat. No. 10,468,905.

(30) Foreign Application Priority Data

Aug. 31, 2016   (KR) .................. 10-2016-0111639

(51) Int. Cl.
*H02J 7/00* (2006.01)
*H02J 7/04* (2006.01)
(Continued)

(52) U.S. Cl.
CPC .............. *H02J 7/045* (2013.01); *H02J 7/025* (2013.01); *H02J 7/027* (2013.01); *H02J 9/005* (2013.01);
(Continued)

(58) Field of Classification Search
CPC ....................................................... H02J 7/045
(Continued)

(56) References Cited

U.S. PATENT DOCUMENTS

| 8,497,658 B2 | 7/2013 | Von Novak et al. |
| 8,823,319 B2 | 9/2014 | Von Novak, III et al. |

(Continued)

FOREIGN PATENT DOCUMENTS

| KR | 10-2011-0109702 A | 10/2011 |
| WO | 2012-165688 A1 | 12/2012 |
| WO | 2013/172630 A1 | 11/2013 |

OTHER PUBLICATIONS

Extended European Search Report dated Feb. 27, 2019, issued in European Application No. 17846980.5.
(Continued)

*Primary Examiner* — Yalkew Fantu
(74) *Attorney, Agent, or Firm* — Jefferson IP Law, LLP

(57) ABSTRACT

An electronic device is provided. The electronic device includes a power receiver (PRx) that includes a receiver coil for receiving a power signal from a wireless power transmitting device and a wireless charging integrated circuit (IC) for converting the power signal into electrical energy, a power management circuit that is electrically connected to the PRx and configured to charge a battery using the electrical energy, and a processor that is electrically connected with the PRx and the power management circuit. The processor activates a power hold mode (PHM) if a charging
(Continued)

level of the battery is a fully charged level and controls auxiliary charging of the battery.

18 Claims, 11 Drawing Sheets

(51) Int. Cl.
    *H02J 50/80*     (2016.01)
    *H02J 9/00*     (2006.01)
    *H02J 50/12*     (2016.01)
    *H02J 7/02*     (2016.01)

(52) U.S. Cl.
    CPC .............. *H02J 50/12* (2016.02); *H02J 50/80* (2016.02); *H02J 7/00034* (2020.01)

(58) Field of Classification Search
    USPC ........................................................ 320/108
    See application file for complete search history.

(56) References Cited

U.S. PATENT DOCUMENTS

| | | | |
|---|---|---|---|
| 8,872,386 B2* | 10/2014 | Mach | H04B 5/0037 307/104 |
| 9,000,723 B2 | 4/2015 | Park et al. | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,178,369 B2 | 11/2015 | Partovi | |
| 9,337,691 B2 | 5/2016 | Ryu et al. | |
| 9,356,659 B2 | 5/2016 | Partovi | |
| 9,496,732 B2 | 11/2016 | Partovi | |
| 9,559,526 B2 | 1/2017 | Von Novak, III et al. | |
| 9,660,486 B2 | 5/2017 | Lee et al. | |
| 10,050,472 B2* | 8/2018 | Guo | B60L 53/12 |
| 2010/0181961 A1 | 7/2010 | Novak et al. | |
| 2010/0207771 A1* | 8/2010 | Trigiani | B60L 11/1816 340/636.1 |
| 2011/0156636 A1 | 6/2011 | Kim | |
| 2011/0241612 A1 | 10/2011 | Ryu et al. | |
| 2012/0235636 A1 | 9/2012 | Partovi | |
| 2012/0293119 A1 | 11/2012 | Park et al. | |
| 2013/0062961 A1 | 3/2013 | Park et al. | |
| 2013/0082647 A1* | 4/2013 | Yoon | H02J 5/005 320/108 |
| 2013/0093390 A1 | 4/2013 | Partovi | |
| 2013/0119927 A1 | 5/2013 | Partovi | |
| 2013/0119928 A1 | 5/2013 | Partovi | |
| 2013/0119929 A1 | 5/2013 | Partovi | |
| 2013/0249479 A1 | 9/2013 | Partovi | |
| 2013/0271069 A1 | 10/2013 | Partovi | |
| 2013/0278209 A1 | 10/2013 | Von Novak, III et al. | |
| 2013/0285604 A1 | 10/2013 | Partovi | |
| 2013/0285605 A1 | 10/2013 | Partovi | |
| 2013/0300204 A1 | 11/2013 | Partovi | |
| 2014/0091637 A1* | 4/2014 | Endo | H02J 5/005 307/104 |
| 2014/0306657 A1 | 10/2014 | Lundgren et al. | |
| 2014/0312836 A1 | 10/2014 | Lundgren et al. | |
| 2014/0361741 A1 | 12/2014 | Von Novak, III et al. | |
| 2015/0180284 A1* | 6/2015 | Kang | H02J 50/80 307/104 |
| 2015/0188359 A1 | 7/2015 | Park et al. | |
| 2016/0056664 A1 | 2/2016 | Partovi | |
| 2016/0105841 A1 | 4/2016 | Kang | |
| 2018/0097409 A1 | 4/2018 | Park et al. | |

OTHER PUBLICATIONS

Indian Office Action dated Jun. 29, 2020, issued in Indian Patent Application No. 201927001149.

* cited by examiner

METHOD AND SYSTEM FOR MANAGING WIRELESS CHARGING

CROSS-REFERENCE TO RELATED APPLICATION(S)

This application is a continuation application of prior application Ser. No. 15/689,818, filed on Aug. 29, 2017, which has issued as U.S. Pat. No. 10,468,905 on Nov. 5, 2019 and was based on and claimed priority under 35 U.S.C § 119(a) of a Korean patent application number 10-2016-0111639, filed on Aug. 31, 2016, in the Korean Intellectual Property Office, the disclosure of which is incorporated by reference herein in its entirety.

TECHNICAL FIELD

The present disclosure relates to wireless charging of an electronic device.

BACKGROUND

A recently released user terminal, such as a smartphone, supports wireless charging in addition to wired charging. For example, if a smartphone is placed on a charging pad, a battery of the smartphone starts charging without a wired connection.

In the case where a battery within a terminal is fully charged, power supplied after being fully charged may be supplied to parts within the terminal because there is no need to supply additional power to the battery.

Also, the charged power of the battery within the terminal may slowly decrease by an internal operation of the terminal or by natural discharge even though the terminal is in a standby or sleep state. In this case, a charging pad may continuously perform auxiliary charging.

The above information is presented as background information only to assist with an understanding of the present disclosure. No determination has been made, and no assertion is made, as to whether any of the above might be applicable as prior art with regard to the present disclosure.

SUMMARY

However, if the battery is continuously supplied with power from the charging pad even though the battery is fully charged, an issue that power is unnecessarily supplied may occur.

Also, in the case of the terminal, a significant amount of heat may be generated if power is continuously supplied to internal parts of the terminal due to the continuous supply of power after the battery is fully charged.

Aspects of the present disclosure are to address at least the above-mentioned problems and/or disadvantages and to provide at least the advantages described below. Accordingly, an aspect of the present disclosure is to provide a method and a system for addressing the above-described problem and problems brought up in this specification.

In accordance with an aspect of the present disclosure, an electronic device is provided. The electronic device includes a power receiver (PRx) that includes a receiver coil configured to receive a power signal from a wireless power transmitting device and a wireless charging integrated circuit (IC) configured to convert the power signal into electrical energy, a power management circuit that is electrically connected to the PRx and configured to charge a battery using the electrical energy, and a processor that is electrically connected with the PRx and the power management circuit. The processor may be configured to activate a power hold mode (PHM) if a charging level of the battery is a fully charged level and may allow the PRx to transmit a charging hold message representing that the PHM is activated to the wireless power transmitting device. The PRx may be configured to receive a charging hold message from the wireless power transmitting device in an active state of the PHM, and the processor may be configured to control auxiliary charging of the battery based on a current charging level of the battery, in response to receiving the charging hold message.

In accordance with another aspect of the present disclosure, a wireless power transmitting device is provided. The wireless power transmitting device includes a power transmitter (PTx) that includes a transmitter coil configured to supply a power signal to an electronic device and a power conversion circuit configured to apply a current to the transmitter coil, and a controller that is electrically connected with the PTx. The controller may be configured to activate a PHM if a charging hold message is received from the electronic device, may allow the PTx to stop supplying the power signal, and may supply the power signal to the electronic device if a specific time elapses from a point in time when the PHM is activated.

In accordance with another aspect of the present disclosure, a charging method of an electronic device is provided. The charging method includes receiving a power signal from a wireless power transmitting device, charging a battery using the power signal, activating a PHM when a charging level of the battery is a fully charged level, transmitting a charging hold message representing that the PHM is activated to a wireless power transmitting device, receiving a charging hold message from the wireless power transmitting device in an active state of the PHM, and controlling auxiliary charging of the battery based on a current charging level of the battery, when the charging hold message is received from the wireless power transmitting device.

According to embodiments disclosed in this specification, it may be possible to prevent power from being continuously supplied from a wireless power transmitting device for the purpose of auxiliary charging even though an electronic device is fully charged.

Also, it may be possible to reduce heat generated by the continuous power supply.

Also, it may be possible to provide the user with information representing that a charging state is released respectively in the wireless power transmitting device and the electronic device immediately if the electronic device and the wireless power transmitting device are spaced apart from each other in a PHM.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
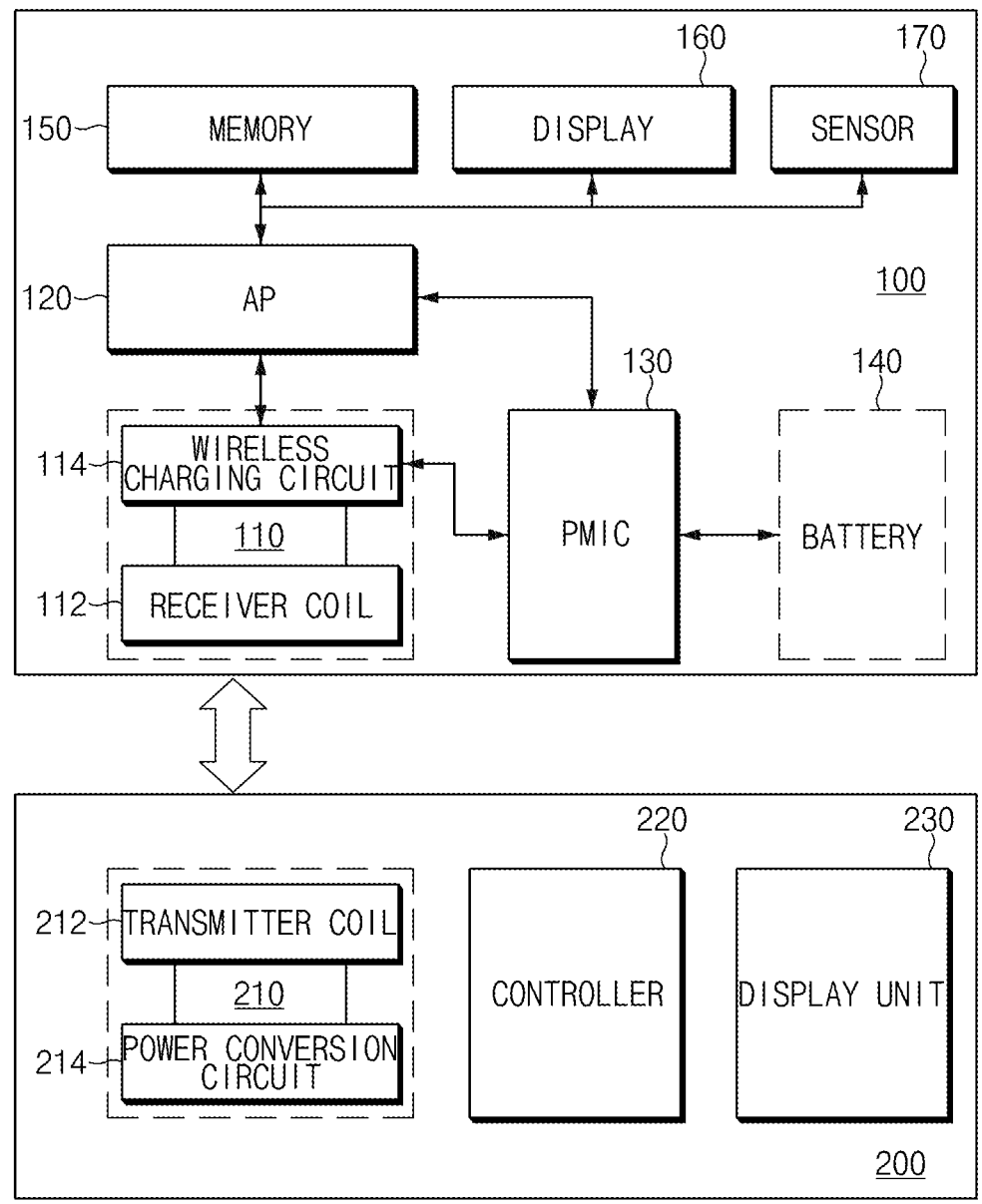
FIG. 1 illustrates a wireless charging system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, the expressions "have," "may have," "include" and "comprise," or "may include" and "may comprise" used herein indicate the existence of corresponding features (e.g., elements such as numeric values, functions, operations, or components) but do not exclude the presence of additional features.

In this disclosure, the expressions "A or B," "at least one of A or/and B," or "one or more of A or/and B," and the like may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms such as "first," "second," and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for," "having the capacity to," "designed to," "adapted to," "made to," or "capable of" The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Main abbreviations used in this specification are as follows. Abbreviations not defined below may be defined when being used in this specification for the first time. In the case of abbreviations that are obvious to skilled ones, definition thereof is omitted.

A4WP=Alliance for Wireless Power
AP=application processor
ASK=amplitude-shift keying
CEP=control error packet
CP=communication processor
FSK=frequency-shift keying
IF=interface
INT=interrupt
PHM=power hold mode
PHP=power hold packet
PMA=Power Matters Alliance
PMIC=power management integrated circuit
PRx=Power Receiver
PTx=Power Transmitter
SSP=signal strength packet
WPC=Wireless Power Consortium Hereinafter, an electronic device according to various embodiments of the present disclosure will be described with reference to the accompanying drawings. The term "user" used herein may refer to a person who uses an electronic device or may refer to a device (e.g., an artificial intelligence electronic device) that uses an electronic device.

FIG. 1 illustrates a wireless charging system according to an embodiment of the present disclosure.

Referring to FIG. 1, the wireless charging system may include an electronic device 100 supporting wireless charging and a wireless power transmitting device 200 supplying power to the electronic device 100.

The electronic device 100 may be interchangeably referred to with various terms, such as a mobile station (MS), user equipment (UE), a user terminal (UT), a wireless terminal, an access terminal (AT), a terminal, a subscriber unit, a subscriber station (SS), a wireless device, a wireless communication device, or a mobile phone that supports wireless charging.

The wireless power transmitting device 200 may mean a device that is able to wirelessly supply power to the electronic device 100 placed on the wireless power transmitting device 200 through magnetic induction. For example, the wireless power transmitting device 200 may be understood as a wireless charging pad. However, in another embodiment, the wireless power transmitting device 200 may wirelessly supply power to the electronic device 100 spaced apart from the wireless power transmitting device 200 within a specific distance through magnetic resonance. A description associated with a magnetic resonance manner will be given with reference to FIGS. 7 and 8. Below, a magnetic induction manner will be described for convenience of description.

The electronic device 100 may include a power receiver (PRx) 110, an AP 120, a PMIC 130, a battery 140, a memory 150, a display 160, and at least one sensor 170. The electronic device 100 may not include at least one of the above-described elements or may further include any other element that is apparent to those skilled in the art. For example, the battery 140 may be embedded in the electronic device 100 and may be detached from the electronic device 100.

The PRx 110 may include a receiver coil 112 and a wireless charging circuit 114. The receiver coil 112 may receive a power signal from the wireless power transmitting device 200. For example, if the electronic device 100 is disposed on the wireless power transmitting device 200, a magnetic field may be generated by a current flowing to a transmitter coil 212, and a current may flow to the receiver coil by the magnetic field. In this regard, the transmitter coil 212 may be understood as a primary coil, and the receiver coil 122 may be understood as a secondary coil. The wireless charging circuit 114 may convert the power signal obtained through the receiver coil 112 into electrical energy. The wireless charging circuit 114 may provide the converted electrical energy to the PMIC 130. In other words, the PRx 110 may receive the power signal from the wireless power transmitting device 200 and may provide the received power to the PMIC 130.

The AP 120 may be electrically connected with the PRx 110 and may control overall operations of the electronic device 110. For example, the AP 120 may create various messages, a packet, and the like needed for wireless charging and may transmit the created messages, packet, and the like to the wireless power transmitting device 200 through the PRx 110. However, in another embodiment, the AP 120 may transmit the message, packet, and the like to the wireless power transmitting device 200 through a specified communication circuit (e.g., Bluetooth (BT), Wi-Fi, or the like).

The AP 120 may be understood as a processor, at least one processor, or part of a system on chip (SoC).

The PMIC 130 may be supplied with power from the PRx 110 to charge the battery 140. The PMIC 130 may monitor a charging current supplied to the battery 140 and a voltage value thereof and may provide the AP 120 with information representing that the battery 140 is fully charged if the battery 140 is fully charged. Here, that the battery 140 is fully charged includes the case where the battery 140 is physically fully charged and the case where the battery 140 is charged to a specific level (e.g., 99.5%) or higher relative to the total battery capacity and is thus viewed as being substantially fully charged.

The battery 140 may be supplied with power from the PMIC 130. The battery 140 may be a built-in battery that is not user-detachable from the electronic device 100 or may be a removable battery that is capable of being detached/replaced by the user.

Instructions for implementing operations according to various embodiments disclosed in this specification may be stored in the memory 150. The instructions may be executed by at least one processor like the AP 120. Also, some of the instructions may be executed by the wireless charging circuit 114 or the PMIC 130.

The display 160 may display a charging level of the battery 140 or may output an icon, a symbol, or the like representing the charging level.

The sensor 170 may include a motion sensor that is capable of sensing motion of the electronic device 100. The motion sensor may include, for example, a gyroscope sensor and/or an acceleration sensor.

The wireless power transmitting device 200 may include a power transmitter (PTx) 210, a controller 220, and a display unit 230. The wireless power transmitting device 200 may not include at least one of the above-described elements or may further include any other element that is apparent to those skilled in the art. For example, the wireless power transmitting device 200 may include a power circuit that is supplied with power from a travel adaptor (TA) and allows appropriately rectified/transformed power to be supplied to the PTx 210.

The PTx 210 may include the transmitter coil 212 and a power conversion circuit 214. The transmitter coil 212 may supply a power signal to the electronic device 100. The power conversion circuit 214 may control a power level such that supply power calculated based on information received from the electronic device 100 is supplied to the electronic device 100.

The controller 220 may perform an overall control of the wireless power transmitting device 200. The controller 220 may create various messages needed to transmit wireless power and may transfer the created messages to the PTx 210. Also, the controller 220 may determine a charging level of the electronic device 100 based on a message obtained from the electronic device 100 or may determine a connection state between the electronic device 100 and the wireless power transmitting device 200 or the like. The controller 220 may be also understood as a kind of processor.

The display unit 230 of the wireless power transmitting device 200 may include at least one of a display or an indicator such as a light emitting diode (LED). For example, the controller 220 may determine an LED color based on a charge status (CS) packet representing a charging level of the battery 140 from the electronic device 100. For example, the controller 220 may allow a green light to be output in the display unit 230 if the CS packet indicates a charging level of 100% and may allow a red light to be output in the display unit 230 if having a value of less than 10 (e.g., a charging level is less than 10%). Besides, if the battery 140 is being charged, in other words, if the PTx 210 is supplying a power signal to the PRx 110, the controller 220 may output an indication (e.g., LED on/off or the like) representing charging in the display unit 230.

Below, an operation between the electronic device 100 and the wireless power transmitting device 200 according to various embodiments will be described with reference to FIGS. 2 to 6.

Figure 2:
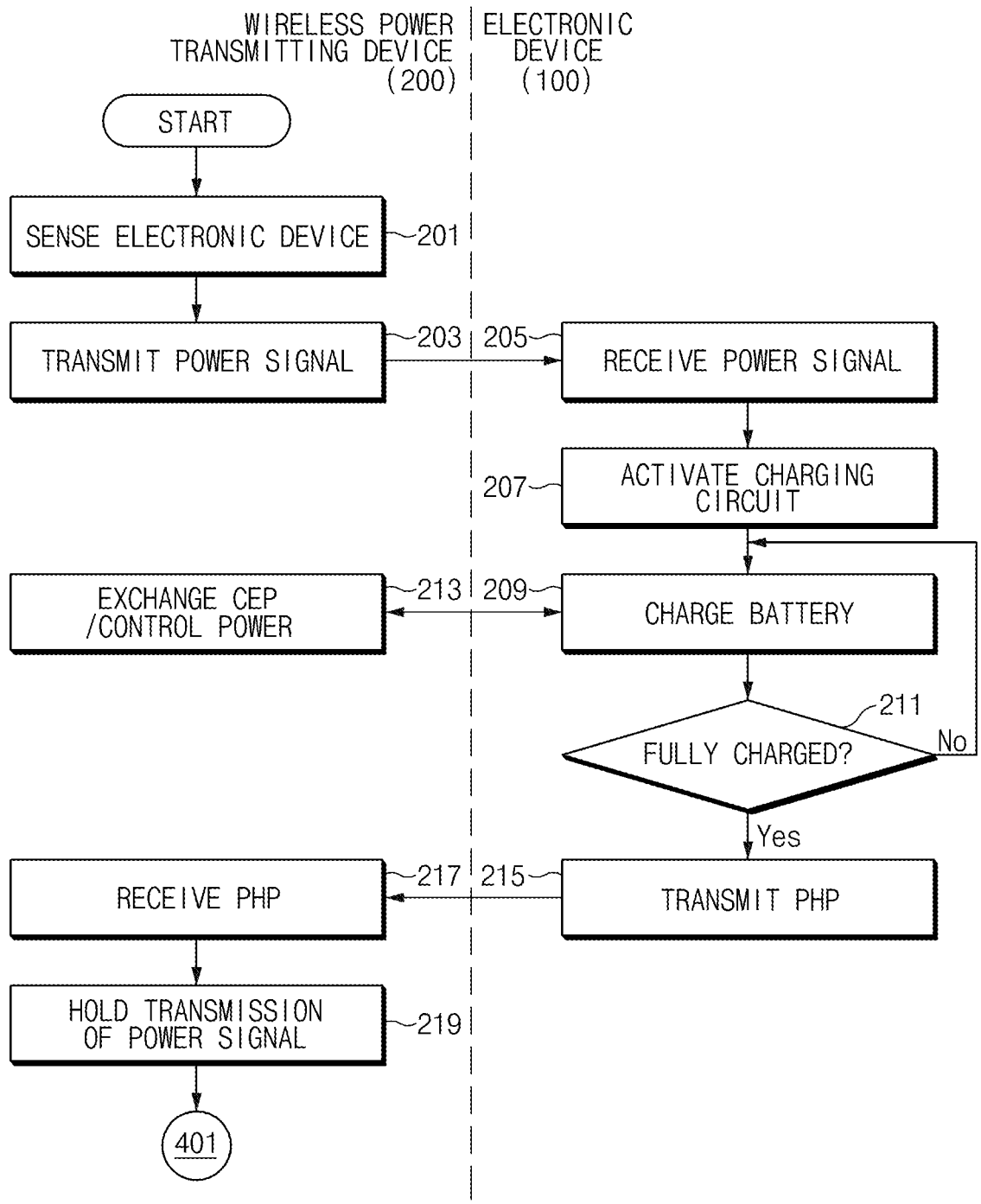
FIG. 2 is a flowchart illustrating a full charging process of wireless charging according to an embodiment of the present disclosure.

FIG. 2 is a flowchart illustrating a full charging process of wireless charging according to an embodiment of the present disclosure.

Referring to FIG. 2, in operation 201, the wireless power transmitting device 200 may sense whether the electronic device 100 is placed on the wireless power transmitting device 200, for example, on an active area for wireless charging. For example, the PTx 210 of the wireless power transmitting device 200 may determine whether the electronic device 100 is placed on the active area, based on the magnitude of a current value obtained by applying a short pulse to the transmitter coil 212 (a resonance shift manner). In another embodiment, the wireless power transmitting device 200 may determine whether the electronic device 100 is placed on the active area, based on a change in a capacitance value of an interface surface or a periphery thereof (a capacitance change manner). Besides, it is possible to determine whether the electronic device 100 for wireless charging is placed on the wireless power transmitting device 200, using various manners.

If the electronic device 100 is sensed, in operation 203, the PTx 210 may transmit a power signal to the PRx 110. In operation 205, the PRx 110 may receive the power signal provided from the PTx 210. This process may be understood as a process in which a magnetic field is induced by a current flowing to the primary coil and a current is then generated in the secondary coil by the induced magnetic field.

In operation 207, a charging circuit of the electronic device 100 may be activated. Here, the charging circuit may be understood as the concept including elements needed to wirelessly charge the battery 140. For example, the wireless charging circuit 114 may be activated by the power signal. Besides, the PMIC 130, the AP 120, or the like that is in a sleep or inactive state may be activated.

In operation 209, the PMIC 130 may charge the battery 140. While charging is made, the electronic device 100 and the wireless power transmitting device 200 may control charging power through exchange of a message for controlling a power level of the power signal. For example, in operation 213, the wireless power transmitting device 200 may increase a power level of the power signal if receiving a CEP having a positive value from the electronic device 100 and may decrease a power level of the power signal if receiving the CEP having a negative value, and may maintain the power signal if receiving the CEP having a value of "0 (zero)." In an embodiment, the CEP may be continuously received at a specified interval while a battery is charged (e.g., while operation 209 is performed).

In operation 211, the AP 120 may determine whether the battery 140 is fully charged. For example, the PMIC 130 may directly determine whether a charging level of the battery 140 is a fully charged level and may provide the determination result to the AP 120, or may provide a charging level of the battery 140 or information about a charging capacity. The AP 120 may determine whether the battery 140 is fully charged, based on information provided from the PMIC 130.

If it is determined that the battery 140 is fully charged, the electronic device 100 may activate a PHM. If the PHM is activated, the electronic device 100 may perform a predefined operation. For example, in operation 215, the electronic device 100 may transmit, to the wireless power transmitting device 200, a charging hold message representing that the PHM is activated, for example, a power hold packet (PHP). In an embodiment, the PHP may be transmitted to the wireless power transmitting device 200, with the PHP modulated in a FSK manner. Besides, if the PHM is activated, the AP 120 may display an icon representing that a charging level of the battery is a fully charged level, in the display 160.

In operation 217, the wireless power transmitting device 200 may receive the PHP from the electronic device 100. If the PHP is received, the wireless power transmitting device 200 may also activate the PHM in the wireless power transmitting device 200. If the PHM is activated in the wireless power transmitting device 200, in operation 219, the wireless power transmitting device 200 may hold, for example, transmission of the power signal to the electronic device 100. Also, the wireless power transmitting device 200 may monitor existence of the electronic device 100 through an analog ping during a specific time and may start to supply power through a digital ping again if the specific time elapses. In this case, until the specific time elapses, the wireless power transmitting device 200 may not attempt the digital ping even though the electronic device 100 is sensed and may transmit a message representing that the PHM is currently activated to the electronic device 100 after entering the digital ping. After the transmission of the power signal is held, the wireless power transmitting device 200 and the electronic device 100 may perform a process following operation 401 of FIG. 4.

Below, timing when power is supplied from the wireless power transmitting device 200 to the electronic device 100 will be described with reference to FIG. 3. A description to be given with reference to FIG. 3 may be understood as corresponding to operation 201 to operation 219 of FIG. 2.

Figure 3:
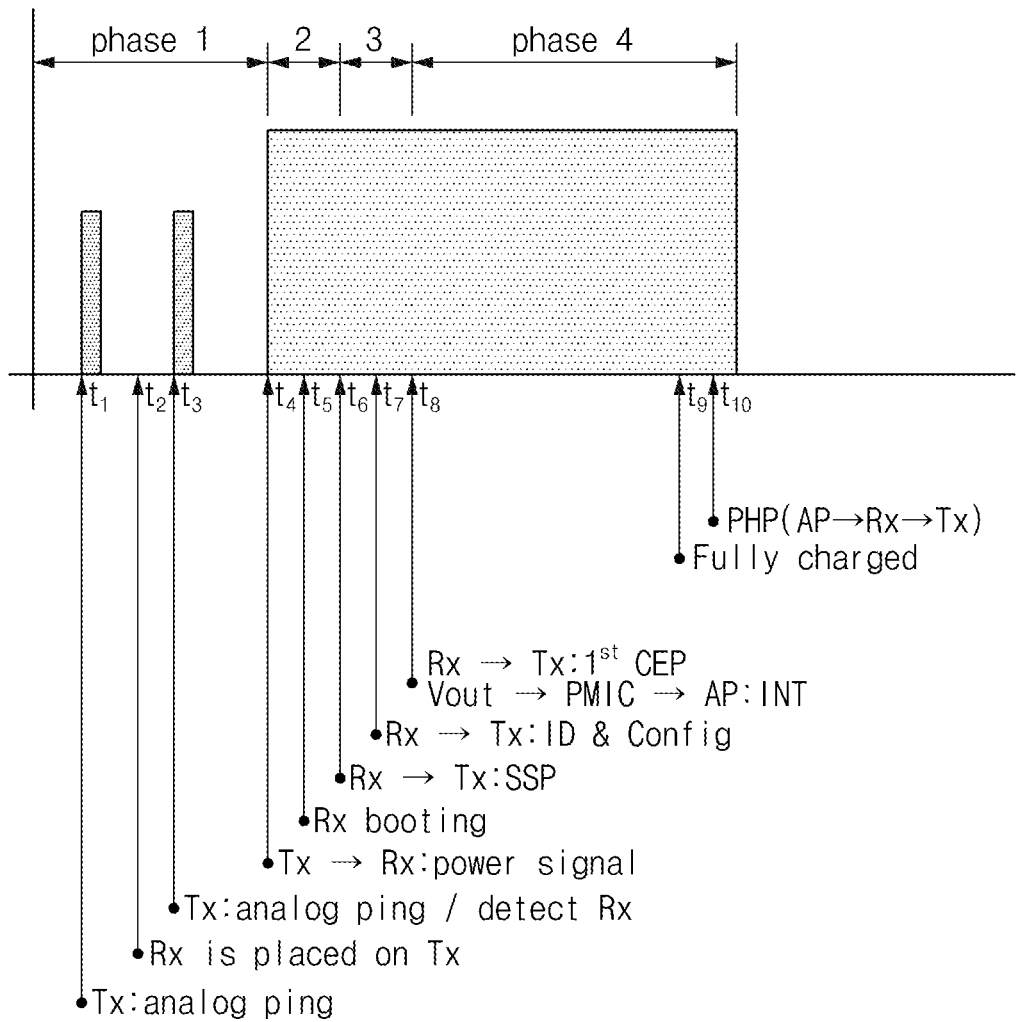
FIG. 3 illustrates charging timing from a charging start point in time to a full charging point in time according to an embodiment of the present disclosure.

FIG. 3 illustrates charging timing from a charging start point in time to a full charging point in time, according to an embodiment of the present disclosure.

Referring to FIG. 3, at t1, the wireless power transmitting device 200 (Tx) may sense whether the electronic device 100 is placed on an interface surface (e.g., an active area). The sensing of the electronic device 100 may be referred to as an "analog ping." For example, operation 201 of FIG. 2 may be understood as an operation in which the wireless power transmitting device 200 performs the analog ping.

If the electronic device 100 is placed on the wireless power transmitting device 200 at t2, the wireless power transmitting device 200 may sense the electronic device 100 by the analog ping performed at t3.

The analog ping may be performed at a specific interval. For example, the wireless power transmitting device 200 may perform the analog ping every 400 ms. However, the time interval may be arbitrary and may be changed depending on device/user settings.

If the electronic device 100 is sensed, the wireless power transmitting device 200 may transmit the power signal to the electronic device at t4 without performing an additional analog ping. A time until the power signal is transmitted (operation 203) corresponds to a first phase (phase 1). The first phase may be referred to as a "selection phase."

If the power signal is received from the wireless power transmitting device 200 (operation 205), at t5, the wireless charging circuit 114 may be booted using the received power. The PRx 110 may transmit an SSP representing the intensity of the power signal to the wireless power transmitting device 200 at t6 (operation 205). If the SSP is not received within the specific time, the wireless power transmitting device 200 may stop supplying the power signal. However, to avoid blurring the subject of the present disclosure, such exceptional circumstances are excluded and explained.

A second phase may be referred to as a ping phase or a digital ping phase to be distinguishable from the analog ping. The second phase may be understood from a point in time when the power signal is transmitted before a third phase.

If the SSP is received from the electronic device 100, the wireless power transmitting device 200 may enter the third phase, for example, an identification and configuration phase. The electronic device 100 may transmit an identification packet and a configuration packet to the wireless power transmitting device 200 at t7. If identification and charging configuration of the electronic device 100 are completed, the electronic device 100 may transmit the first CEP to the wireless power transmitting device 200 at t8. Also, the wireless charging circuit 114 may supply an output voltage Vout to the PMIC 130, and the PMIC 130 may transmit an INT representing that charging starts to the AP 120. In an embodiment, if receiving the INT, the AP 120 may output an icon representing charging in the display 160. Also, the AP 120 may verify the wireless charging circuit 114 to determine whether the battery 140 is currently charged wirelessly or wiredly and may output an appropriate icon in the display 160.

After t8, the electronic device 100 may charge the battery 140 using the received power signal, (operation 209) and this may be referred to as a "fourth phase," for example, a "power transfer phase." If the battery 140 is fully charged at t9, the AP 120 may transmit the PHP to the wireless power transmitting device 200 through the PTx 110 at t10. In other words, the electronic device 100 may enter the PHM from t10. The wireless power transmitting device 200 may enter the PHM if receiving the PHP from the electronic device 100. For example, the wireless power transmitting device 200 may change a period of the digital ping or an operating condition of the digital ping if the PHM is activated. For example, the digital ping may be performed immediately if the electronic device 100 is detected by the analog ping while the PHM is deactivated. However, if the PHM is activated, even though the electronic device 100 is detected by the analog ping, the digital ping may be performed after a specific period (or time) elapses.

Below, a process after entering the PHM will be described with reference to FIGS. 4 and 5.

Figure 4:
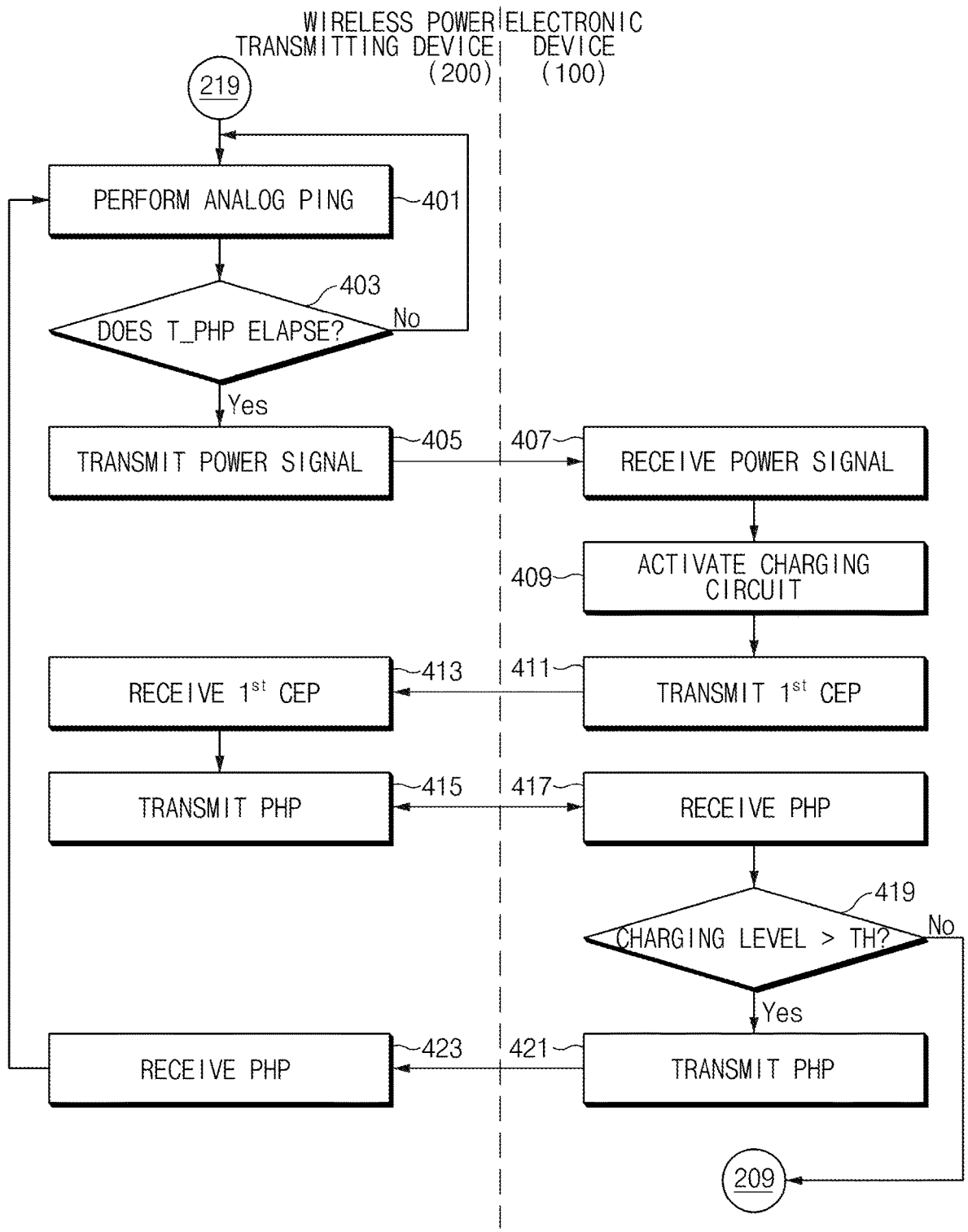
FIG. 4 is a flowchart illustrating a process after full charging of wireless charging according to an embodiment of the present disclosure.

FIG. 4 is a flowchart illustrating a process after full charging of wireless charging according to an embodiment of the present disclosure.

Referring to FIG. 4, in operation 401, the wireless power transmitting device 200 may perform a sensing operation of the electronic device 100 at a specified time interval, that is, the analog ping once or more. Operation 401 may be performed after operation 219 of FIG. 2. In other words, operation 401 may be performed after the wireless power transmitting device 200 enters the PHM.

In operation 403, the wireless power transmitting device 200 may determine whether a predefined time T_PHP elapses in the PHM. During this time, the wireless power transmitting device 200 may perform the analog ping repeatedly and may not perform power transmission corresponding to the digital ping phase. In other words, unlike a description given in FIG. 3, even though the electronic device 100 is sensed by execution of the analog ping, the wireless power transmitting device 200 may not enter the digital ping phase.

In an embodiment, the wireless power transmitting device 200 may release the PHM if the electronic device 100 is not sensed by the analog ping performed during the T_PHP period. For example, a phenomenon that a charging terminal is detached from a charging pad may occur like the case where the user moves with the electronic device 100. In this case, the wireless power transmitting device 200 may release the PHM and may enter the digital ping phase immediately after the analog ping if the new electronic device 100 is placed on the wireless power transmitting device 200 for the purpose of charging. However, in FIGS. 4 and 5, a description may be given under the assumption that the electronic device 100 is continuously placed on the wireless power transmitting device 200 during T_PHP.

If T_PHP elapses, in other words, if a specific time elapses from a point in time when the PHM is activated, in operation 405, the wireless power transmitting device 200 may supply the power signal to the electronic device 100. In operation 407, the electronic device 100 may receive the power signal from the wireless power transmitting device 200.

In operation 407, unlike operation 205, the electronic device 100 receives a charging hold message while the PHM is activated. However, since charging of the battery 140 is held, operation 409 may be performed the same as operation 207.

In operation 411, the electronic device 100 may transmit the first CEP to the wireless power transmitting device 200. For example, an operation that corresponds to an operation performed at t8 of FIG. 3 may be performed in operation 411.

In operation 413, the wireless power transmitting device 200 may receive the first CEP from the electronic device 100. The PHM of the wireless power transmitting device 200 when receiving the first CEP may still be in an active state. In this case, in operation 415, in response to the received CEP, the wireless power transmitting device 200 may transmit, to the electronic device 100, the PHP representing that the PHM of the wireless power transmitting device 200 is activated, together with supplying the power signal according to the CEP, in response to the received CEP.

In operation 417, the electronic device 100 may receive the PHP. When the electronic device 100 receives the PHP from the wireless power transmitting device 200, also, the PHM of the electronic device 100 may not be released but may still be in an active state. In this case, the electronic device 100 may determine whether a battery currently needs auxiliary charging, in response to receiving the PHP. For example, in operation 419, the electronic device 100 may determine whether a charging level of the battery 140 is higher than a threshold TH associated with the auxiliary charging. For example, if the battery 140 is charged to 99% or higher, the electronic device 100 may determine that there is no need for the auxiliary charging. However, in the case where a battery level is less than 99%, the electronic device 100 may determine to perform the auxiliary charging of the battery 140.

If a charging level of the battery 140 is higher than the threshold TH associated with the auxiliary charging, that is, in the case where it is determined that there is no need for the auxiliary charging, in operation 421, the electronic device 100 may again transmit the PHP to the wireless power transmitting device 200. In operation 423, the wireless power transmitting device 200 may again perform operation 401 if receiving the PHP.

If it is determined that there is a need for the auxiliary charging of the battery 140, the electronic device 100 may perform operation 209 of FIG. 2. For example, the electronic device 100 may perform charging (operation 209) of the battery 140 until it is determined that a battery is fully charged in operation 211. Since the PHP is not received from the electronic device 100, the wireless power transmitting device 200 may release the PHM and may continuously provide the power signal to the electronic device 100. If the PHP is received in operation 217 because the battery 140 is fully charged, the wireless power transmitting device 200 may stop transmitting the power signal (i.e., activate the PHM) and may again repeat the process of FIG. 4.

Figure 5:
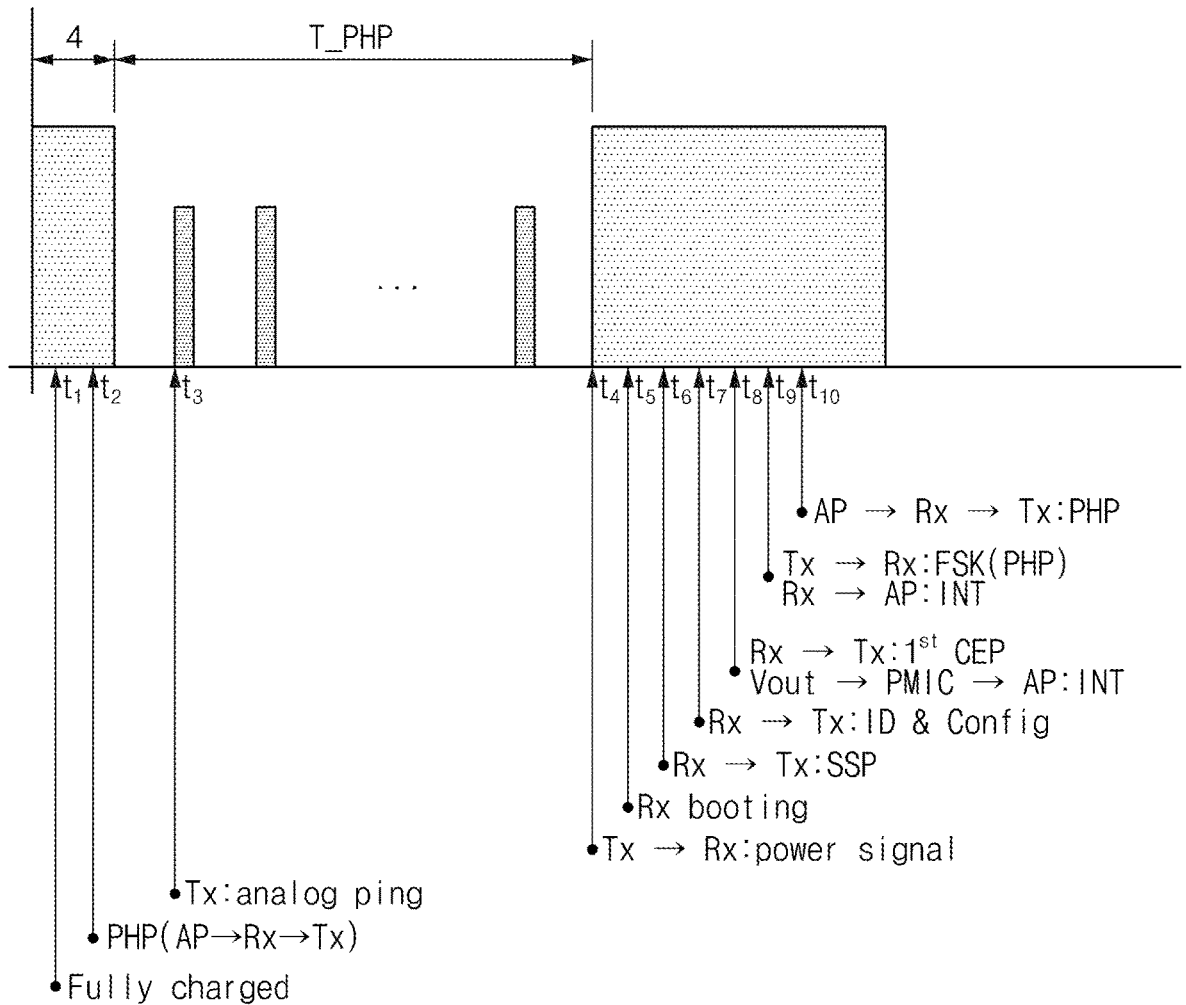
FIG. 5 illustrates charging timing after a full charging point in time according to an embodiment of the present disclosure.

FIG. 5 illustrates charging timing after a full charging point in time according to an embodiment of the present disclosure.

Referring to FIG. 5, t1 and t2 may correspond to the last period t9 to t10 of a fourth phase of FIG. 3. If the PHP is received at t2, the wireless power transmitting device 200 may perform the analog ping during T_PHP (operation 401). In an embodiment, T_PHP may be set to 60 seconds. In other words, the wireless power transmitting device 200 may attempt the auxiliary charging of the electronic device at an interval of 60 seconds. T_PHP may be changed to an appropriate time interval by device/user settings.

If T_PHP elapses, the wireless power transmitting device 200 may transmit the power signal to the electronic device 100 (operation 405) at t4. In other words, the first phase of FIG. 3 may be replaced with T_PHP if the PHM of the wireless power transmitting device 200 is in an active state.

If the power signal is received from the wireless power transmitting device 200 (operation 407), at t5, the wireless charging circuit 114 may be booted using the received power. The PRx 110 may transmit an SSP representing the intensity of the power signal to the wireless power transmitting device 200 at t6 (operation 409). The electronic device 100 may transmit an identification packet and a configuration packet to the wireless power transmitting device 200 at t7. At t8, the electronic device 100 may transmit the first CEP to the wireless power transmitting device 200. Also, the wireless charging circuit 114 may supply an output voltage Vout to the PMIC 130, and the PMIC 130 may transmit an INT representing that charging starts to the AP 120.

At t9, the wireless power transmitting device 200 may transmit the PHP to the electronic device 100 together with the power signal in response to receiving the CEP (operation 413 and operation 415). If receiving the PHP while the PHM is in an active state (operation 417), the electronic device 100 may determine whether there is a need for the auxiliary charging of the battery 140 (operation 419). If it is determined that there is no need for the auxiliary charging, the electronic device 100 may again transmit the PHP to the wireless power transmitting device 200 (operation 421) at t10.

After t8, the electronic device 100 may charge the battery 140 using the received power signal (operation 209). This step may be referred to as a "power transfer phase." If the battery 140 is fully charged at t9, the AP 120 may transmit the PHP to the wireless power transmitting device 200 through the PTx 110 at t10. In other words, the electronic device 100 may enter the PHM from t10. The wireless power transmitting device 200 may enter the PHM if receiving the PHP from the electronic device 100.

The above-described process may make it possible to prevent power from being continuously supplied from the wireless power transmitting device 200 for the purpose of the auxiliary charging even though the electronic device 100 is fully charged. Also, it may be possible to reduce heat generated by the continuous power supply.

In a possible user scenario, the user may detach the electronic device 100 from the wireless power transmitting device 200 during T_PHP. An exemplification associated with the scenario will be described with reference to FIG. 6.

Figure 6:
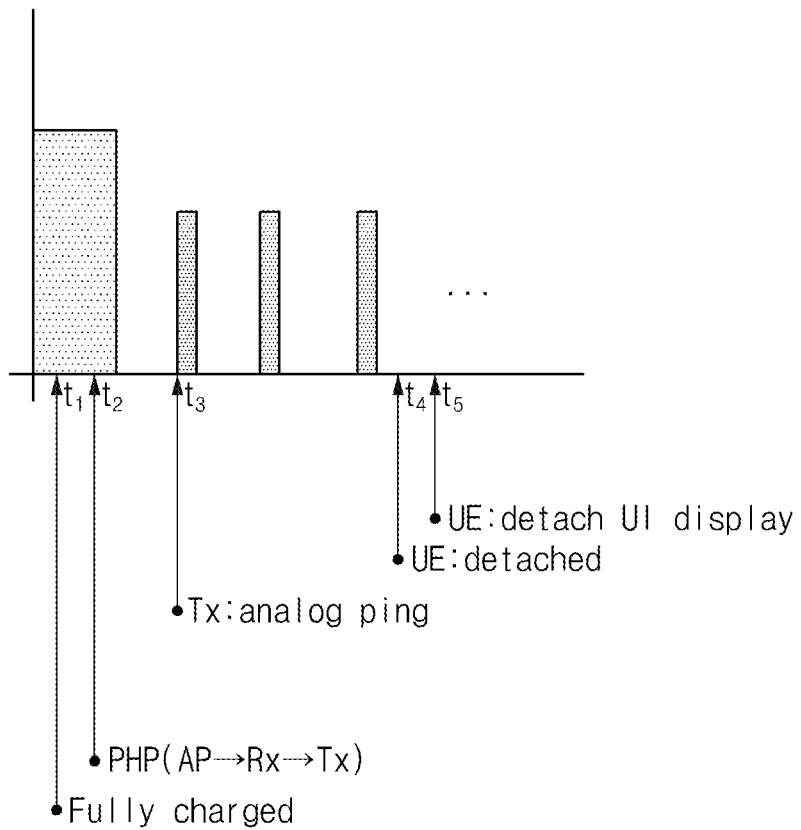
FIG. 6 illustrates charging timing after a full charging point in time according to an embodiment of the present disclosure.

FIG. 6 illustrates a charging timing after a full charging point in time according to an embodiment of the present disclosure.

Referring to FIG. 6, if the battery 140 of the electronic device 100 is fully charged at t1 and the electronic device 100 transmits the PHP to the wireless power transmitting device 200 at t2, both the electronic device 100 and the wireless power transmitting device 200 may enter the PHM. As described with reference to FIGS. 4 and 5, if entering the PHM, the wireless power transmitting device 200 may perform an analog ping operation during T_PHP. For example, at t3, the wireless power transmitting device 200 may perform a sensing operation of the electronic device 100.

If the electronic device 100 is detached from the wireless power transmitting device 200 (e.g., is spaced apart from an interface surface by a specific distance or more) at t4 within the T_PHP period, the wireless power transmitting device 200 may recognize that the electronic device 100 is detached, by a next analog ping. That is, if the electronic device 100 is not sensed within the T_PHP period, the wireless power transmitting device 200 may output an indication representing that a connection between the electronic device 100 and the wireless power transmitting device 200 is released, in the display unit 230.

However, in the case of the electronic device 100, since the PHM is currently activated even though there is no power supplied from the wireless power transmitting device 200 during T_PHP, a user interface (UI) representing disconnection may not be displayed immediately.

Accordingly, in an embodiment, the electronic device 100 may sense motion of the electronic device 100 using the sensor 170 while the PHM is activated. For example, the electronic device 100 may deactivate most sensors during charging, but may activate a sensor sensing the motion of the electronic device 100, such as a gyroscope sensor or an acceleration sensor, if entering the PHM during charging.

In an embodiment, if the motion of the electronic device 100 exceeding a specified threshold range is sensed by at least one motion sensor while the PHM is activated, the electronic device 100 may output a UI representing that a connection (or charging) between the electronic device 100 and the wireless power transmitting device 200 is released, in the display 160.

Accordingly, it may be possible to provide the user with information representing that a charging state is released respectively in the wireless power transmitting device 200 and the electronic device 100 immediately if the electronic device 100 and the wireless power transmitting device 200 are spaced apart from each other in the PHM.

In another embodiment, in the case where the electronic device 100 exchanges a message with the wireless power transmitting device 200 through a separate communication channel, the electronic device 100 may receive a message representing that the electronic device 100 is not sensed from the wireless power transmitting device 200. If receiving the message, the electronic device 100 may output an indication representing that a connection between the electronic device 100 and the wireless power transmitting device 200 is released, in the display 160. For example, in the case of wireless charging of a resonance manner to be described with reference to FIG. 7, a communication between an electronic device and a wireless power transmitting device is made using a frequency band (e.g., BT, Wi-Fi, or the like) different from a frequency for charging. And, in the case where a receiver coil 112 is not sensed in a transmitter coil 212, a communication circuit may convey information associated with the case to a communication circuit. The electronic device may output an indication representing that charging is interrupted in a display unit of the electronic device.

Figure 7:
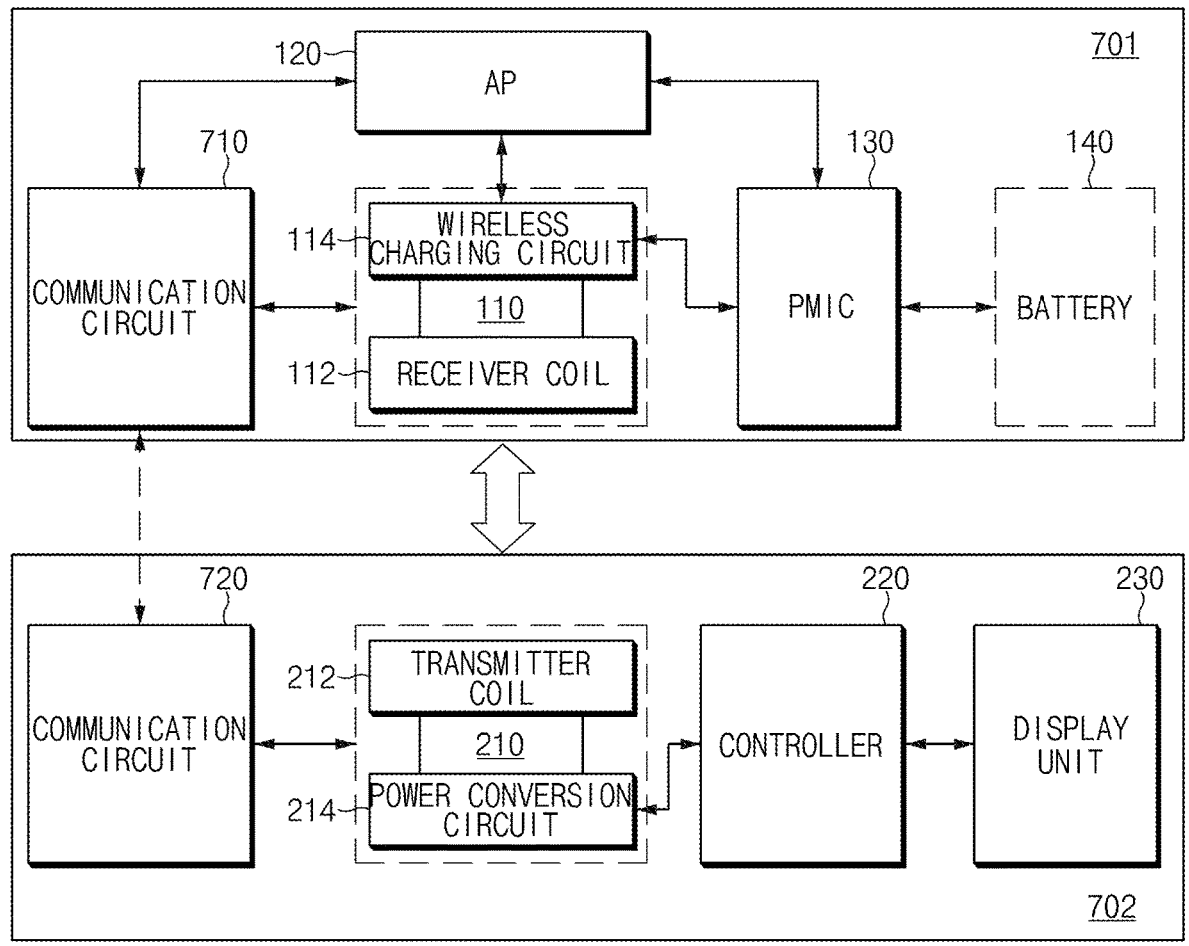
FIG. 7 illustrates a wireless charging system according to an embodiment of the present disclosure.

FIG. 7 illustrates a wireless charging system according to an embodiment of the present disclosure.

Referring to FIG. 7, a wireless charging system may include an electronic device 701 and a wireless power transmitting device 702. In the wireless charging system of FIG. 7, an element that corresponds to or is the same as that of the wireless charging system of FIG. 1 may use the same reference numeral, and a description thereof will not be repeated here. Also, an element(s), which is not associated with the wireless charging system, from among the elements illustrated in FIG. 1 is excluded.

Referring to FIG. 7, the electronic device 701 may receive charging power from the wireless power transmitting device 702 in a magnetic resonance manner. For example, the transmitter coil 212 may transfer power to the receiver coil 112 using a signal of a first frequency band. Also, the communication circuit 710 of the electronic device 701 may exchange messages needed for charging with the communication circuit 720 of the wireless power transmitting device 702 using a signal of a second frequency band. For example, a communication manner such as BT, Bluetooth low energy (BLE), Wi-Fi, or the like may be used for message exchange.

The wireless charging system of FIG. 7 may use the magnetic resonance manner for power transfer in which a frequency band for power transfer and a frequency band for communication (transmitting/receiving of a message) are different from each other. This method may be referred as an out-band manner. In contrast, the wireless charging system of FIG. 1 may use the magnetic induction manner for power transfer in which power transfer and transmitting/receiving of a message are made in the same frequency band. This method may be referred as an in-band manner According to an embodiment, in a wireless charging system of FIG. 7, the power signal may be transferred using the transmitter coil 212 and the receiver coil 112. For example, the analog ping and the digital ping performed by a wireless charging system of FIG. 1 may be replaced with a short beacon and a long beacon performed by the wireless charging system of FIG. 7. Also, transmitting/receiving of packets performed in the wireless charging system of FIG. 1, such as SSP and CEP, may be performed by the communication circuit 710 and the communication circuit 720 in the wireless charging system of FIG. 7. Accordingly, those skilled in the art may apply various embodiments described with reference to FIGS. 1 to 6 to the wireless charging system of FIG. 7.

Figure 8:
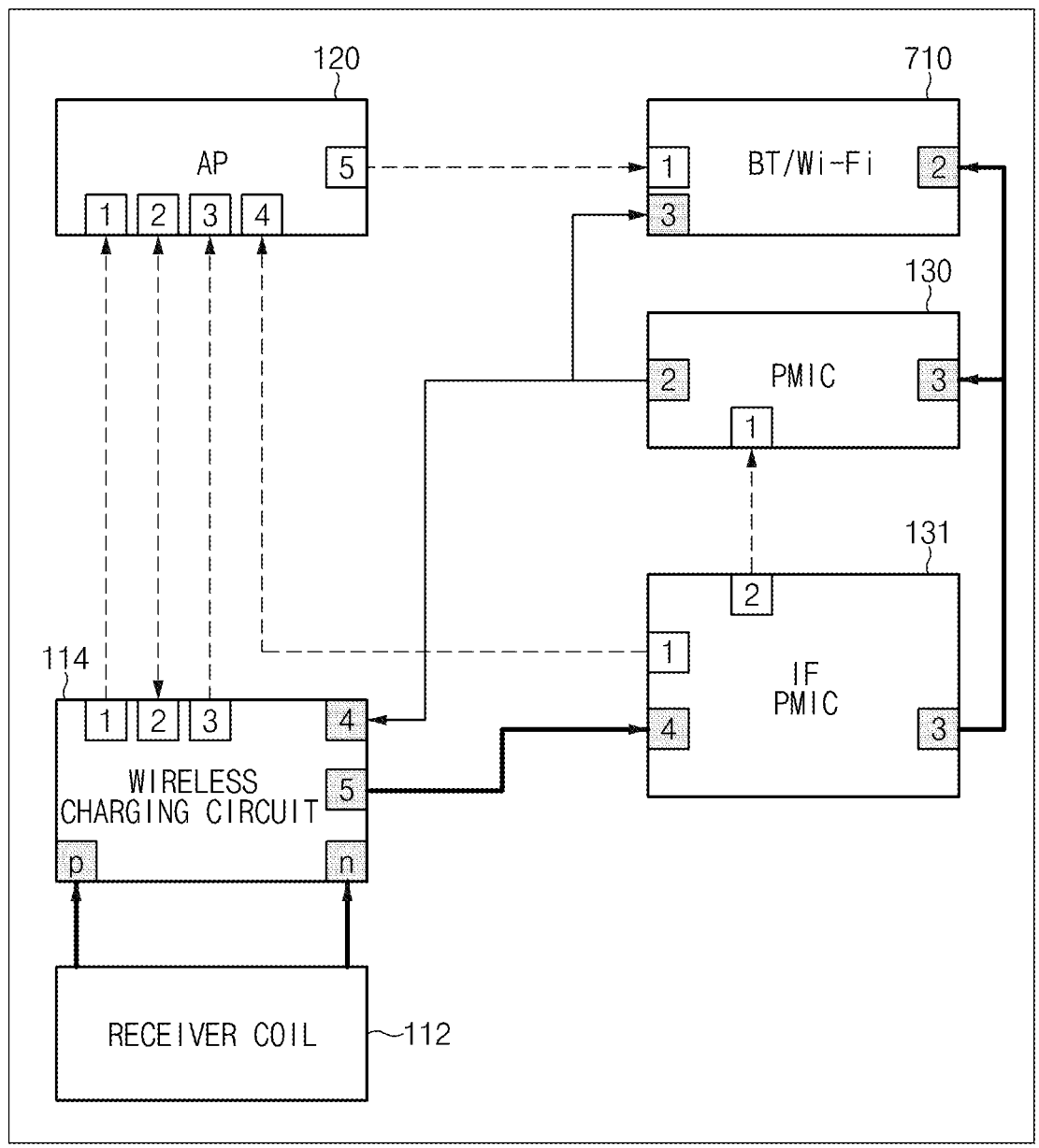
FIG. 8 illustrates a flow of power and a message in a wireless charging system according to an embodiment of the present disclosure.

FIG. 8 illustrates a flow of power and a message in a wireless charging system according to an embodiment of the present disclosure. In FIG. 8, a dotted line represents a flow of a control message/INT, and a thick solid line represents a flow of power.

Referring to FIG. 8, an alternating current obtained in the receiver coil 112 may be supplied to a terminal "p" and a terminal "n" of the wireless charging circuit 114. The wireless charging circuit 114 may process rectification and transformation on the alternating current obtained at the terminal "p" and the terminal "n" and may supply the processed power to a terminal 4 (e.g., WC_IN) of an interface PMIC (IF PMIC) 131 through a terminal 5 (e.g., Vout). The power supplied to the IF PMIC 131 may be supplied to a terminal 3 of the PMIC 130 and/or a terminal 2 of the communication circuit 710 after power conversion in the IF PMIC 131. The communication circuit 710 may be omitted depending on a kind of the wireless charging system. Also, the PMIC 130 may convert the received power to an appropriate level and may supply the converted power to the wireless charging circuit 114 or the communication circuit 710 through a terminal 2.

The IF PMIC 131 may provide an INT representing that charging starts from a terminal 1 (e.g., CHG_INT) to a terminal 4 (e.g., GPIO) of the AP 120. If the INT is generated from the PMIC 130 or the IF PMIC 131, the AP 120 may determine whether wireless charging starts through the wireless charging circuit 114, using a signal provided from a terminal 1 (e.g., VOUT_GD) of the wireless charging circuit 114 to a terminal 1 (e.g., WP-DET) of the AP 120. Also, the AP 120 may determine whether the wireless charging complies with any applicable standard (e.g., VPC/PMA/A4WP) and information needed with regard to the wireless charging, using a message exchanged through an communication interface (e.g., I2C) connected between a terminal 2 of the wireless charging circuit 114 and a terminal 2 of the AP 120.

Meanwhile, in the case where the AP 120 wants to exchange a message with the wireless power transmitting device 702 through the communication circuit 710, the AP 120 may transmit a control message to the communication circuit 710 through a terminal 5 (e.g., an universal asynchronous receiver/transmitter (UART)) of the wireless charging circuit 114. Also, in an embodiment, a communication interface (e.g., I2C) may be connected between the wireless charging circuit 114 and the communication circuit 710. For example, in the case of wireless charging of a resonance manner in which a frequency band for charging and a frequency band for communication are different from each other, various messages needed for charging may be transferred from the wireless charging circuit 114 to the communication circuit 710 through the communication interface. The communication circuit 710 may transfer the various messages to the communication circuit 720 of the wireless power transmitting device 702 and may provide a message provided from the communication circuit 720 to the wireless charging device 114 through the communication interface.

According to various embodiments, the electronic device 100 may further include additional elements to perform various functions. Exemplifications of the electronic device 100 associated with the above description will be described with reference to FIGS. 9 to 11.

Figure 9:
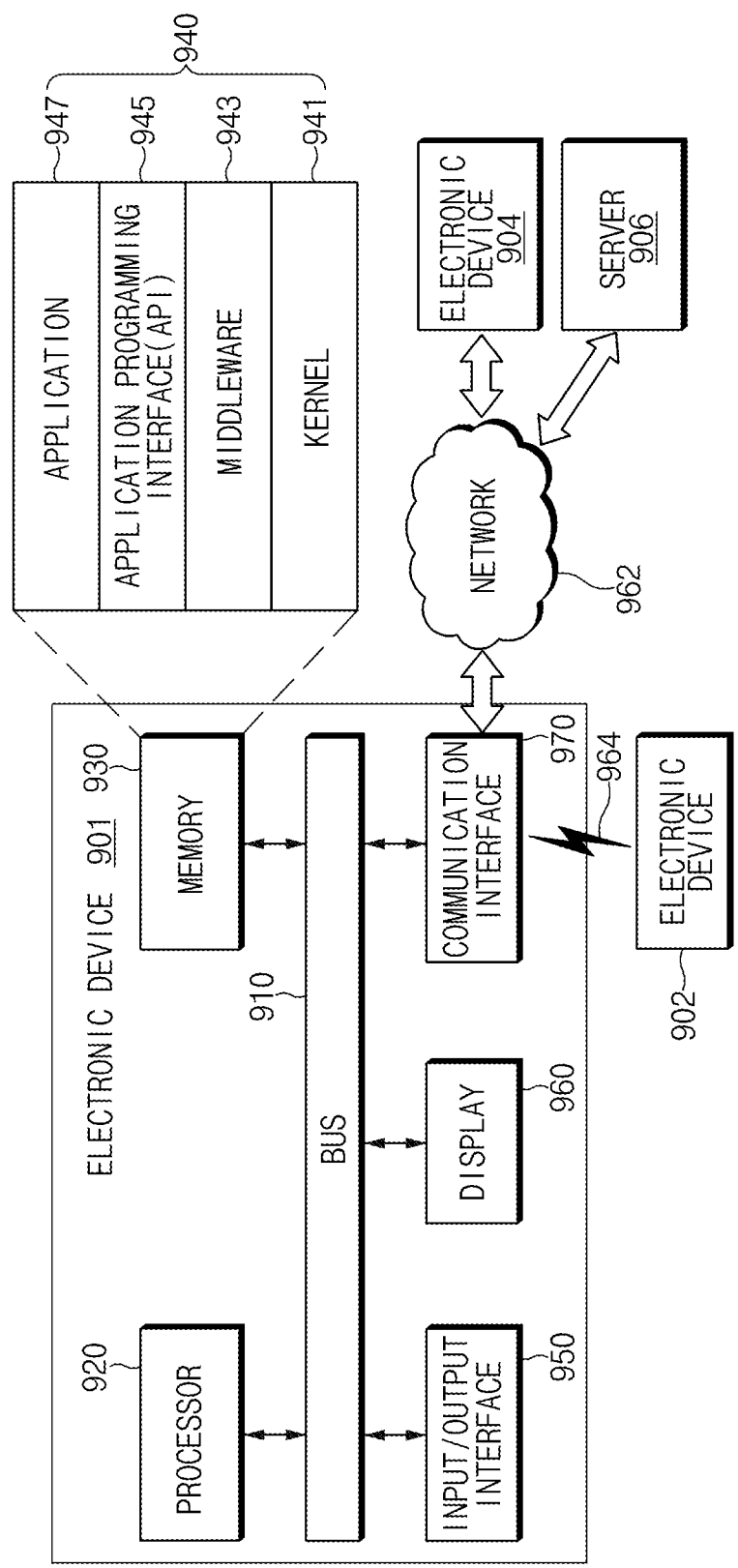
FIG. 9 illustrates an electronic device in a network environment according to various embodiments of the present disclosure.

FIG. 9 illustrates an electronic device in a network environment, according to various embodiments of the present disclosure.

Referring to FIG. 9, according to various embodiments, an electronic device 901, a first electronic device 902, a second electronic device 904, or a server 906 may be connected with each other over a network 962 or local wireless communication 964. The electronic device 901 may include a bus 910, a processor 920, a memory 930, an input/output interface 950, a display 960, and a communication interface 970. According to an embodiment, the electronic device 901 may not include at least one of the above-described elements or may further include other element(s).

For example, the bus 910 may interconnect the above-described elements 910 to 970 and may include a circuit for conveying communications (e.g., a control message and/or data) among the above-described elements.

The processor 920 may include one or more of a CPU, an AP, or a communication processor (CP). For example, the processor 920 may perform an arithmetic operation or data processing associated with control and/or communication of at least other elements of the electronic device 901.

The memory 930 may include a volatile and/or nonvolatile memory. For example, the memory 930 may store instructions or data associated with at least one other element(s) of the electronic device 901. According to an embodiment, the memory 930 may store software and/or a program 940. The program 940 may include, for example, a kernel 941, a middleware 943, an application programming interface (API) 945, and/or an application program (or "an application") 947. At least a part of the kernel 941, the middleware 943, or the API 945 may be referred to as an "operating system (OS)."

For example, the kernel 941 may control or manage system resources (e.g., the bus 910, the processor 920, the memory 930, and the like) that are used to execute operations or functions of other programs (e.g., the middleware 943, the API 945, and the application program 947). Furthermore, the kernel 941 may provide an interface that allows the middleware 943, the API 945, or the application program 947 to access discrete elements of the electronic device 901 so as to control or manage system resources.

The middleware 943 may perform, for example, a mediation role such that the API 945 or the application program 947 communicates with the kernel 941 to exchange data.

Furthermore, the middleware 943 may process one or more task requests received from the application program 947 according to a priority. For example, the middleware 943 may assign the priority, which makes it possible to use a system resource (e.g., the bus 910, the processor 920, the memory 930, or the like) of the electronic device 901, to at least one of the application program 947. For example, the middleware 943 may process the one or more task requests according to the priority assigned to the at least one, which makes it possible to perform scheduling or load balancing on the one or more task requests.

The API 945 may be, for example, an interface through which the application program 947 controls a function provided by the kernel 941 or the middleware 943, and may include, for example, at least one interface or function (e.g., an instruction) for a file control, a window control, image processing, a character control, or the like.

The input/output interface 950 may play a role, for example, as an interface which transmits an instruction or data input from a user or another external device, to other element(s) of the electronic device 901. Furthermore, the input/output interface 950 may output an instruction or data, received from another element(s) of the electronic device 901, to a user or another external device.

The display 960 may include, for example, a liquid crystal display (LCD), an LED display, an organic LED (OLED) display, a microelectromechanical systems (MEMS) display, or an electronic paper display. The display 960 may display, for example, various contents (e.g., a text, an image, a video, an icon, a symbol, and the like) to a user. The display 960 may include a touch screen and may receive, for example, a touch, gesture, proximity, or hovering input using an electronic pen or a part of a user's body.

For example, the communication interface 970 may establish communication between the electronic device 901 and an external device (e.g., the first electronic device 902, the second electronic device 904, or the server 906). For example, the communication interface 970 may be connected to the network 962 over wireless communication or wired communication to communicate with the external device (e.g., the second electronic device 904 or the server 906).

The wireless communication may use at least one of, for example, long-term evolution (LTE), LTE Advanced (LTE-A), code division multiple access (CDMA), wideband CDMA (WCDMA), universal mobile telecommunications system (UMTS), wireless broadband (WiBro), global system for mobile communications (GSM), or the like, as cellular communication protocol. Furthermore, the wireless communication may include, for example, the local wireless communication 964. The local wireless communication 964 may include at least one of Wi-Fi, BT, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 901 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 962 may include at least one of telecommunications networks, for example, a computer network (e.g., local access network (LAN) or wide access network (WAN)), an Internet, or a telephone network.

Each of the first and second electronic devices 902 and 904 may be a device of which the type is different from or the same as that of the electronic device 901. According to an embodiment, the server 906 may include a group of one or more servers. According to various embodiments, all or a portion of operations that the electronic device 901 will perform may be executed by another or plural electronic devices (e.g., the first electronic device 902, the second electronic device 904 or the server 906). According to an embodiment, in the case where the electronic device 901 executes any function or service automatically or in response to a request, the electronic device 901 may not perform the function or the service internally, but, alternatively additionally, it may request at least a portion of a function associated with the electronic device 901 at other electronic device (e.g., the electronic device 902 or 904 or the server 906). The other electronic device may execute the requested function or additional function and may transmit the execution result to the electronic device 901. The electronic device 901 may provide the requested function or service using the received result or may additionally process the received result to provide the requested function or service. To this end, for example, cloud computing, distributed computing, or client-server computing may be used.

Figure 10:
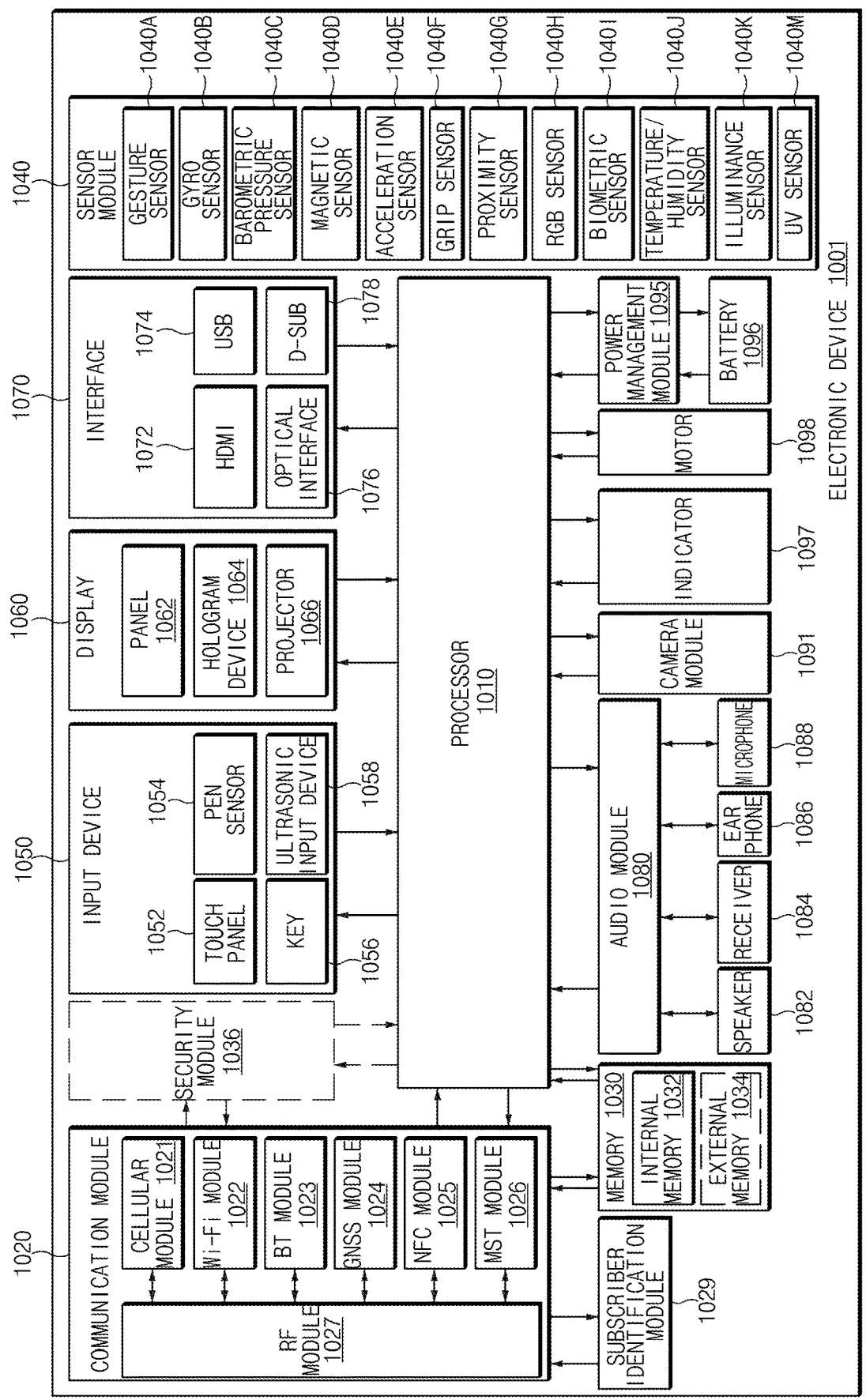
FIG. 10 is a block diagram of an electronic device according to various embodiments of the present disclosure.

FIG. 10 illustrates a block diagram of an electronic device according to various embodiments of the present disclosure.

Referring to FIG. 10, an electronic device 1001 may include, for example, all or a part of the electronic device 901 illustrated in FIG. 9. The electronic device 1001 may include one or more processors (e.g., an AP) 1010, a communication module 1020, a subscriber identification module 1029, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may drive, for example, an OS or an application to control a plurality of hardware or software elements connected to the processor 1010 and may process and compute a variety of data. For example, the processor 1010 may be implemented with a SoC. According to an embodiment, the processor 1010 may further include a graphic processing unit (GPU) and/or an image signal processor (ISP). The processor 1010 may include at least a part (e.g., a cellular module 1021) of elements illustrated in FIG. 10. The processor 1010 may load an instruction or data, which is received from at least one of other elements (e.g., a nonvolatile memory), into a volatile memory and process the loaded instruction or data. The processor 1010 may store a variety of data in the nonvolatile memory.

The communication module 1020 may be configured the same as or similar to the communication interface 970 of FIG. 9. The communication module 1020 may include the cellular module 1021, a Wi-Fi module 1022, a BT module 1023, a GNSS module 1024 (e.g., a GPS module, a Glonass module, a Beidou module, or a Galileo module), a NFC module 1025, a MST module 1026 and a radio frequency (RF) module 1027.

The cellular module 1021 may provide, for example, voice communication, video communication, a character service, an Internet service, or the like over a communication network. According to an embodiment, the cellular module 1021 may perform discrimination and authentication of the electronic device 1001 within a communication network using the subscriber identification module (e.g., a SIM card) 1029. According to an embodiment, the cellular module 1021 may perform at least a portion of functions that the processor 1010 provides. According to an embodiment, the cellular module 1021 may include a CP.

Each of the Wi-Fi module 1022, the BT module 1023, the GNSS module 1024, the NFC module 1025, or the MST module 1026 may include a processor for processing data exchanged through a corresponding module, for example. According to an embodiment, at least a part (e.g., two or more) of the cellular module 1021, the Wi-Fi module 1022, the BT module 1023, the GNSS module 1024, the NFC module 1025, or the MST module 1026 may be included within one IC or an IC package.

For example, the RF module 1027 may transmit and receive a communication signal (e.g., an RF signal). For example, the RF module 1027 may include a transceiver, a power amplifier module (PAM), a frequency filter, a low noise amplifier (LNA), an antenna, or the like. According to another embodiment, at least one of the cellular module 1021, the Wi-Fi module 1022, the BT module 1023, the GNSS module 1024, the NFC module 1025, or the MST module 1026 may transmit and receive an RF signal through a separate RF module.

The subscriber identification module 1029 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1030 (e.g., the memory 930) may include an internal memory 1032 or an external memory 1034. For example, the internal memory 1032 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1034 may further include a flash drive such as compact flash (CF), SD, micro-SD, mini-SD, extreme digital (xD), a multimedia card (MMC), a memory stick, or the like. The external memory 1034 may be operatively and/or physically connected to the electronic device 1001 through various interfaces.

A security module 1036 may be a module that includes a storage space of which a security level is higher than that of the memory 1030 and may be a circuit that guarantees safe data storage and a protected execution environment. The security module 1036 may be implemented with a separate circuit and may include a separate processor. For example, the security module 1036 may be in a smart chip or an SD card, which is removable, or may include an embedded secure element (eSE) embedded in a fixed chip of the electronic device 1001. Furthermore, the security module 1036 may operate based on an OS that is different from the OS of the electronic device 1001. For example, the security module 1036 may operate based on java card open platform (JCOP) OS.

The sensor module 1040 may measure, for example, a physical quantity or may detect an operation state of the electronic device 1001. The sensor module 1040 may convert the measured or detected information to an electric signal. For example, the sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, the proximity sensor 1040G, a color sensor 1040H (e.g., red, green, blue (RGB) sensor), a biometric sensor 1040I, a temperature/humidity sensor 1040J, an illuminance sensor 1040K, or an UV sensor 1040M. Although not illustrated, additionally or generally, the sensor module 1040 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1040 may further include a control circuit for controlling at least one or more sensors included therein. According to an embodiment, the electronic device 1001 may further include a processor that is a part of the processor 1010 or independent of the processor 1010 and is configured to control the sensor module 1040. The processor may control the sensor module 1040 while the processor 1010 remains at a sleep state.

The input device 1050 may include, for example, a touch panel 1052, a (digital) pen sensor 1054, a key 1056, or an ultrasonic input unit 1058. For example, the touch panel 1052 may use at least one of capacitive, resistive, infrared and ultrasonic detecting methods. Also, the touch panel 1052 may further include a control circuit. The touch panel 1052 may further include a tactile layer to provide a tactile reaction to a user.

The (digital) pen sensor 1054 may be, for example, a part of a touch panel or may include an additional sheet for recognition. The key 1056 may include, for example, a physical button, an optical key, or a keypad. The ultrasonic input device 1058 may detect (or sense) an ultrasonic signal, which is generated from an input device, through a microphone (e.g., a microphone 1088) and may check data corresponding to the detected ultrasonic signal.

The display 1060 (e.g., the display 960) may include a panel 1062, a hologram device 1064, or a projector 1066. The panel 1062 may be the same as or similar to the display 960 illustrated in FIG. 9. The panel 1062 may be implemented, for example, to be flexible, transparent or wearable. The panel 1062 and the touch panel 1052 may be integrated into a single module. The hologram device 1064 may display a stereoscopic image in a space using a light interference phenomenon. The projector 1066 may project light onto a screen so as to display an image. For example, the screen may be arranged in the inside or the outside of the electronic device 1001. According to an embodiment, the display 1060 may further include a control circuit for controlling the panel 1062, the hologram device 1064, or the projector 1066.

The interface 1070 may include, for example, a HDMI 1072, a USB 1074, an optical interface 1076, or a D-subminiature (D-sub) 1078. The interface 1070 may be included, for example, in the communication interface 970 illustrated in FIG. 9. Additionally or generally, the interface 1070 may include, for example, a mobile high definition link (MHL) interface, a SD card/MMC interface, or an infrared data association (IrDA) standard interface.

The audio module 1080 may convert a sound and an electric signal in dual directions. At least a part of the audio module 1080 may be included, for example, in the input/output interface 950 illustrated in FIG. 9. The audio module 1080 may process, for example, sound information that is input or output through a speaker 1082, a receiver 1084, an earphone 1086, or the microphone 1088.

The camera module 1091 may shoot a still image or a video. According to an embodiment, the camera module 1091 may include at least one or more image sensors (e.g., a front sensor or a rear sensor), a lens, an ISP, or a flash (e.g., an LED or a xenon lamp).

The power management module 1095 may manage, for example, power of the electronic device 1001. According to an embodiment, a PMIC, a charger IC, or a battery or fuel gauge may be included in the power management module 1095. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1096 and a voltage, current or temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, and the like. The motor 1098 may convert an electrical signal into a mechanical vibration and may generate effects such as vibration, haptic, and the like. Although not illustrated, a processing device (e.g., a GPU) for supporting a mobile TV may be included in the electronic device 1001. The processing device for supporting the mobile TV may process media data according to the standards of digital multimedia broadcasting (DMB), digital video broadcasting (DVB), MediaFLO™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 11:
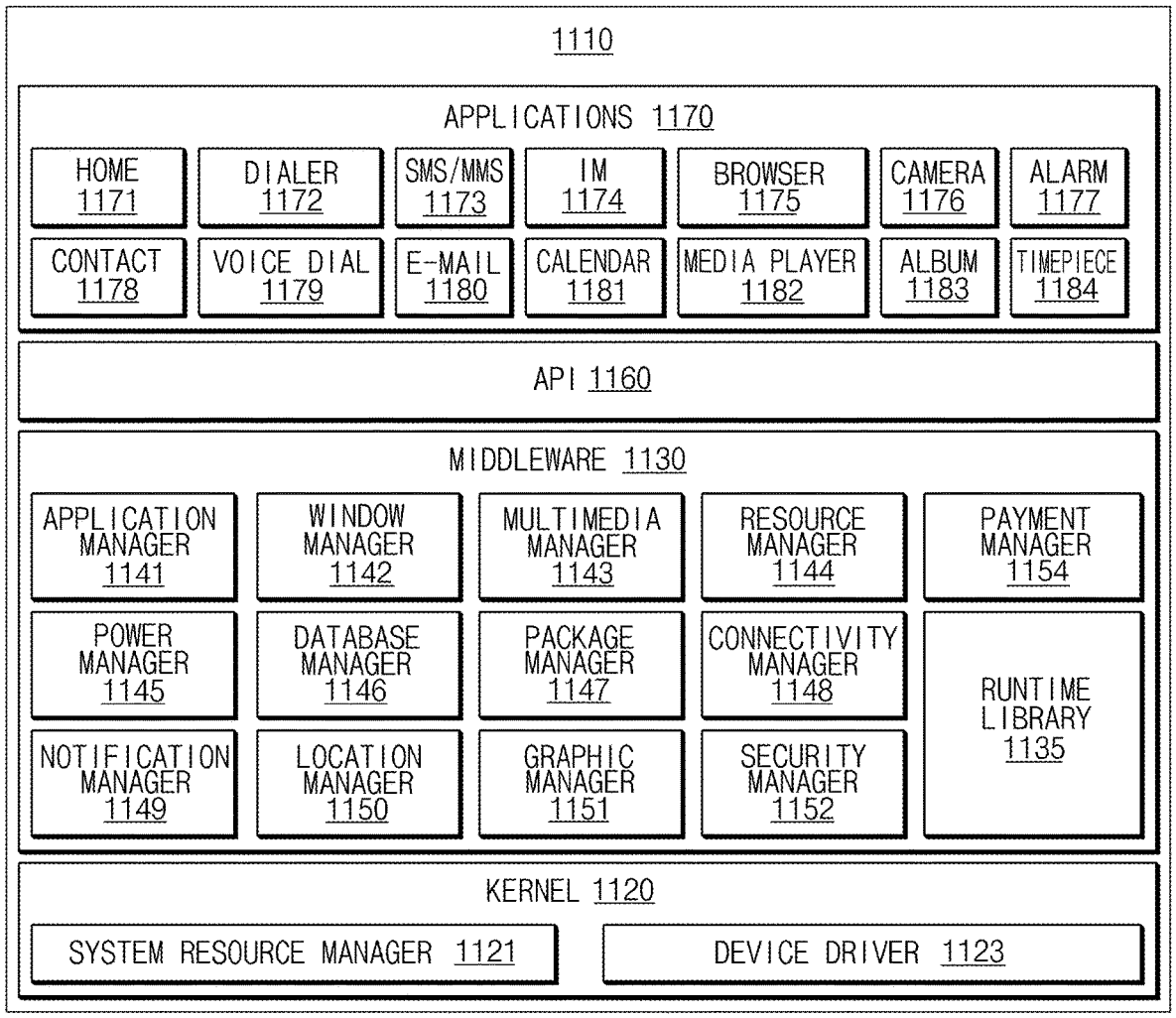
FIG. 11 illustrates a block diagram of a program module according to various embodiments of the present disclosure.

FIG. 11 illustrates a block diagram of a program module according to various embodiments of the present disclosure.

Referring to FIG. 11, a program module 1110 (e.g., the program 940) may include an OS to control resources associated with an electronic device (e.g., the electronic device 901), and/or diverse applications (e.g., the application program 947) driven on the OS. The OS may be, for example, Android, iOS, Windows, Symbian, or Tizen.

The program module 1110 may include a kernel 1120, a middleware 1130, an API 1160, and/or an application 1170. At least a portion of the program module 1110 may be preloaded on an electronic device or may be downloadable from an external electronic device (e.g., the first electronic device 902, the second electronic device 904, the server 906, or the like).

The kernel 1120 (e.g., the kernel 941) may include, for example, a system resource manager 1121 or a device driver 1123. The system resource manager 1121 may control, allocate, or retrieve system resources. According to an embodiment, the system resource manager 1121 may include a process managing unit, a memory managing unit, a file system managing unit, or the like. The device driver 1123 may include, for example, a display driver, a camera driver, a BT driver, a shared memory driver, a USB driver, a keypad driver, a Wi-Fi driver, an audio driver, or an inter-process communication (IPC) driver.

The middleware 1130 may provide, for example, a function that the application 1170 needs in common, or may provide diverse functions to the application 1170 through the API 1160 to allow the application 1170 to efficiently use limited system resources of the electronic device. According to an embodiment, the middleware 1130 (e.g., the middleware 943) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, a security manager 1152, or a payment manager 1154.

The runtime library 1135 may include, for example, a library module that is used by a compiler to add a new function through a programming language while the application 1170 is being executed. The runtime library 1135 may perform input/output management, memory management, or capacities about arithmetic functions.

The application manager 1141 may manage, for example, a life cycle of at least one application of the application 1170. The window manager 1142 may manage a graphic user interface (GUI) resource that is used in a screen. The multimedia manager 1143 may identify a format necessary for playing diverse media files, and may perform encoding or decoding of media files using a codec suitable for the format. The resource manager 1144 may manage resources such as a storage space, memory, or source code of at least one application of the application 1170.

The power manager 1145 may operate, for example, with a basic input/output system (BIOS) to manage a battery or power, and may provide power information for an operation of an electronic device. The database manager 1146 may generate, search for, or modify database that is to be used in at least one application of the application 1170. The package manager 1147 may install or update an application that is distributed in the form of package file.

The connectivity manager 1148 may manage, for example, wireless connection such as Wi-Fi or BT. The notification manager 1149 may display or notify an event such as arrival message, appointment, or proximity notification in a mode that does not disturb a user. The location manager 1150 may manage location information about an electronic device. The graphic manager 1151 may manage a graphic effect that is provided to a user, or manage a user interface relevant thereto. The security manager 1152 may provide a general security function necessary for system security, user authentication, or the like. According to an embodiment, in the case where an electronic device (e.g., the electronic device 901) includes a telephony function, the middleware 1130 may further include a telephony manager for managing a voice or video call function of the electronic device.

The middleware 1130 may include a middleware module that combines diverse functions of the above-described elements. The middleware 1130 may provide a module specialized to each OS kind to provide differentiated functions. Additionally, the middleware 1130 may dynamically remove a part of the preexisting elements or may add new elements thereto.

The API 1160 (e.g., the API 945) may be, for example, a set of programming functions and may be provided with a configuration that is variable depending on an OS. For example, in the case where an OS is the android or the iOS, it may provide one API set per platform. In the case where an OS is the Tizen, it may provide two or more API sets per platform.

The application 1170 (e.g., the application program 947) may include, for example, one or more applications capable of providing functions for a home 1171, a dialer 1172, a short message system (SMS)/multimedia message system (MMS) 1173, an instant message (IM) 1174, a browser 1175, a camera 1176, an alarm 1177, a contact 1178, a voice dial 1179, an e-mail 1180, a calendar 1181, a media player 1182, an album 1183, a timepiece 1184, and a payment. Although not shown, the application 1170 may further include, for example, one or more applications capable of providing functions for health care (e.g., measuring an exercise quantity, blood sugar, or the like), or offering of environment information (e.g., information of barometric pressure, humidity, temperature, or the like).

According to an embodiment, the application 1170 may include an application (hereinafter referred to as "information exchanging application" for descriptive convenience) to support information exchange between an electronic device (e.g., the electronic device 901) and an external electronic device (e.g., the first electronic device 902 or the second electronic device 904). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1170 may include an application (e.g., a health care application of a mobile medical device) that is assigned in accordance with an attribute of an external electronic device. According to an embodiment, the application 1170 may include an application that is received from an external electronic device (e.g., the first electronic device 902, the second electronic device 904, or the server 906). According to an embodiment, the application 1170 may include a preloaded application or a third party application that is downloadable from a server. The names of elements of the program module 1110 according to the embodiment may be modifiable depending on kinds of OSs.

According to various embodiments, at least a portion of the program module 1110 may be implemented by software, firmware, hardware, or a combination of two or more thereof. At least a portion of the program module 1110 may be implemented (e.g., executed), for example, by the processor (e.g., the processor 1010). At least a portion of the program module 1110 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit," "logic," "logical block," "component" and "circuit." The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor (e.g., the processor 920), may cause the one or more processors to perform a function corresponding to the instruction. The computer-readable storage media, for example, may be the memory 930.

A computer-readable recording medium may include a hard disk, a floppy disk, a magnetic media (e.g., a magnetic tape), an optical media (e.g., a compact disc read only memory (CD-ROM) and a DVD, a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
  a power receiver including a receiver coil configured to receive a power signal from a wireless power transmitting device and a wireless charging integrated circuit (IC) configured to convert the power signal into electrical energy;
  a power management circuit electrically connected to the power receiver and configured to charge a battery using the electrical energy; and
  a processor electrically connected with the power receiver and the power management circuit,
  wherein the processor is configured to:
    activate a power hold mode if a charging level of the battery is a fully charged level and allow the power receiver to transmit a charging hold message to the wireless power transmitting device, and
    if a current charging level is less than a threshold, deactivate the power hold mode and perform an auxiliary charging of the battery.
2. The electronic device of claim 1, wherein the processor is further configured to:
  determine whether the current charging level is less than the threshold if a power signal is received from the wireless power transmitting device during the power hold mode is activated, and
  if the current charging level is less than a threshold, deactivate the power hold mode and perform the aux- iliary charging of the battery by wirelessly receiving power from the wireless power transmitting device.

3. The electronic device of claim 2, wherein the processor is further configured to transmit a charging hold message to the wireless power transmitting device if the current charging level of the battery is equal to or greater than the threshold.

4. The electronic device of claim 1,
wherein the power receiver is further configured to transmit a control error packet (CEP) for controlling a level of the power signal to the wireless power transmitting device, and
wherein the power management circuit is further configured to charge the battery using a power signal received in response to the transmitted CEP.

5. The electronic device of claim 4, wherein the processor is further configured to control the auxiliary charging of the battery based on the current charging level of the battery if a charging hold message is received from the wireless power transmitting device in response to transmitting the CEP in an active state of the power hold mode.

6. The electronic device of claim 1, wherein the power receiver is further configured to receive a charging hold message from the wireless power transmitting device after a specific time elapses from a point in time when the power hold mode is activated.

7. The electronic device of claim 1, further comprising:
a display,
wherein, if the power hold mode is activated, the processor is further configured to display an icon representing that the charging level of the battery is the fully charged level in the display.

8. The electronic device of claim 1, further comprising:
a display; and
at least one motion sensor,
wherein the processor is further configured to, if motion of the electronic device exceeding a specified threshold range is sensed by the at least one motion sensor while the power hold mode is activated, output a user interface (UI) representing that a connection between the electronic device and the wireless power transmitting device is released in the display.

9. The electronic device of claim 8, wherein the at least one motion sensor includes at least one of a gyroscope sensor or an acceleration sensor.

10. A charging method of an electronic device, the method comprising:
receiving a power signal from a wireless power transmitting device;
charging a battery using the power signal;
activating a power hold mode when a charging level of the battery is a fully charged level;
transmitting a charging hold message to the wireless power transmitting device;
and
if a current charging level is less than a threshold, deactivating the power hold mode and performing an auxiliary charging of the battery.

11. The method of claim 10, further comprising:
determining whether the current charging level is less than the threshold if a power signal is received from the wireless power transmitting device during the power hold mode is activated, and
wherein the performing the auxiliary charging comprises, if the current charging level is less than a threshold, performing the auxiliary charging of the battery by wirelessly receiving power from the wireless power transmitting device.

12. The method of claim 10, further comprising:
transmitting a control error packet (CEP) for controlling a level of the power signal to the wireless power transmitting device; and
charging the battery using a power signal received in response to the transmitted control error packet.

13. The method of claim 10, further comprising:
receiving a charging hold message from the wireless power transmitting device after a specific time elapses from a point in time when the power hold mode is activated.

14. The method of claim 10, further comprising:
displaying an icon representing that the charging level of the battery is the fully charged level in a display of the electronic device if the power hold mode is activated.

15. The method of claim 10, further comprising:
transmitting a charging hold message to the wireless power transmitting device if the current charging level of the battery is equal to or greater than the threshold.

16. The method of claim 12, further comprising:
controlling the auxiliary charging of the battery based on the current charging level of the battery if a charging hold message is received from the wireless power transmitting device in response to transmitting the CEP in an active state of the power hold mode.

17. The method of claim 10, further comprising:
if motion of the electronic device exceeding a specified threshold range is sensed while the power hold mode is activated, displaying a user interface (UI) representing that a connection between the electronic device and the wireless power transmitting device is released.

18. The method of claim 17, further comprising detecting the motion of the electronic device using at least one of a gyroscope sensor or an acceleration sensor.

* * * * *